(12) United States Patent
Huang

(10) Patent No.: US 6,462,947 B1
(45) Date of Patent: Oct. 8, 2002

(54) DEVICE CASE WITH AIR PURIFYING FUNCTION

(76) Inventor: Hsi Cheng Huang, No. 6 Alley 45 Lane 219 Jan-Inc Street, Shulin City Taipei Hsien (TW)

(*) Notice: Subject to any disclaimer, the term of this patent is extended or adjusted under 35 U.S.C. 154(b) by 0 days.

(21) Appl. No.: 10/038,609

(22) Filed: Jan. 8, 2002

(51) Int. Cl.[7] .................................................. H05H 7/20
(52) U.S. Cl. ..................... 361/695; 55/471; 55/506; 55/524; 174/35 MS; 174/35 GC; 210/209; 210/493.5; 210/499; 422/4; 422/24; 422/177; 428/359; 428/397; 454/184; 454/187
(58) Field of Search ..................... 55/423, 479, 524; 174/35 R, 35 MS, 35 GC; 210/209, 493.5, 499; 361/687, 694–695; 422/4, 24, 168, 177; 428/359, 397; 454/186, 187, 57

(56) References Cited

U.S. PATENT DOCUMENTS

| | | | | |
|---|---|---|---|---|
| 5,514,036 A | * | 5/1996 | Lin | 454/184 |
| 6,010,400 A | * | 1/2000 | Krainiak et al. | 454/187 |
| 6,159,421 A | * | 12/2000 | Fujii | 422/4 |
| 6,261,449 B1 | * | 7/2001 | Scott | 210/209 |
| 6,309,296 B1 | * | 10/2001 | Schwenk et al. | 454/184 |
| 6,421,238 B1 | * | 7/2002 | Negishi | 361/695 |

\* cited by examiner

Primary Examiner—Gregory Thompson
(74) Attorney, Agent, or Firm—Rosenberg, Klein & Lee

(57) ABSTRACT

A device case is constructed to include a front frame, a face panel, a metal wire gauze filter mounted in an air input port in the face panel, an air output port disposed at a back side, an induced-draft fan mounted in a front frame behind the face panel and adapted to draw outside air through the air input port and the air output port, an ultraviolet lamp installed in the front frame above the induced-draft fan, and a layer of titanium dioxide photocatalyst coated on the face panel, said frame, the wire gauze filter, and an inside wall of the computer case within the radiation of ultraviolet light from the ultraviolet lamp.

3 Claims, 4 Drawing Sheets

DEVICE CASE WITH AIR PURIFYING FUNCTION

BACKGROUND OF THE INVENTION

1. Field of the Invention

The present invention relates to a device case and, more particularly, to a computer case, which purifies air during the operation of the computer.

2. Description of the Related Art

A regular computer case is simply a container adapted to hold the major parts of a computer in position. Further, it is well known that the coating of titanium dioxide on a lamp tube, lens, or vehicle rear-view mirror prevents adhesion of dust and condensing of moisture. When radiated by ultraviolet rays under 40 nm from the sun or a fluorescent lamp, electrons and electron holes are produced at the surface of the titanium dioxide. The electrons reduce oxygen in air into active oxidized ions. The electron holes oxidize water into active —OH. The oxidation effect resulted from the radiation of ultraviolet rays on photocatalyst (titanium dioxide) is capable of decomposing organic dust and grease contained in motor vehicle waste gas. Therefore, under the radiation of ultraviolet rays, the carbon element contained in organic substance at the surface of titanium dioxide will be carried away by oxidized ions, and the hydrogen element contained in organic substance at the surface of titanium dioxide will be decomposed by —OH. This decomposing function achieves a purifying effect to skill bacteria, remove bad smell, and prevent adhesion of dirt.

Therefore it is desirable to combine photocatalyst and ultraviolet light source means to form an apparatus for purifying the air.

SUMMARY OF THE INVENTION

The present invention has been accomplished under the circumstances in view. It is the main object of the present invention to provide a device case, which functions as an air purifier. According to the present invention, a metal wire gauze filter is provided in an air input port in the face panel of the device case, an induced-draft fan is provided behind the metal wire gauze filter and controlled to draw outside air into the air input port toward an air output port at the rear side of the device case, and an ultraviolet lamp is installed in the device case and controlled to emit light onto a titanium dioxide coating on the face panel, the wire gauze filter, and the inside wall of the device case to purify air passing through the air input port and the air output port.

DETAILED DESCRIPTION OF THE PREFERRED EMBODIMENT

Figure 1:
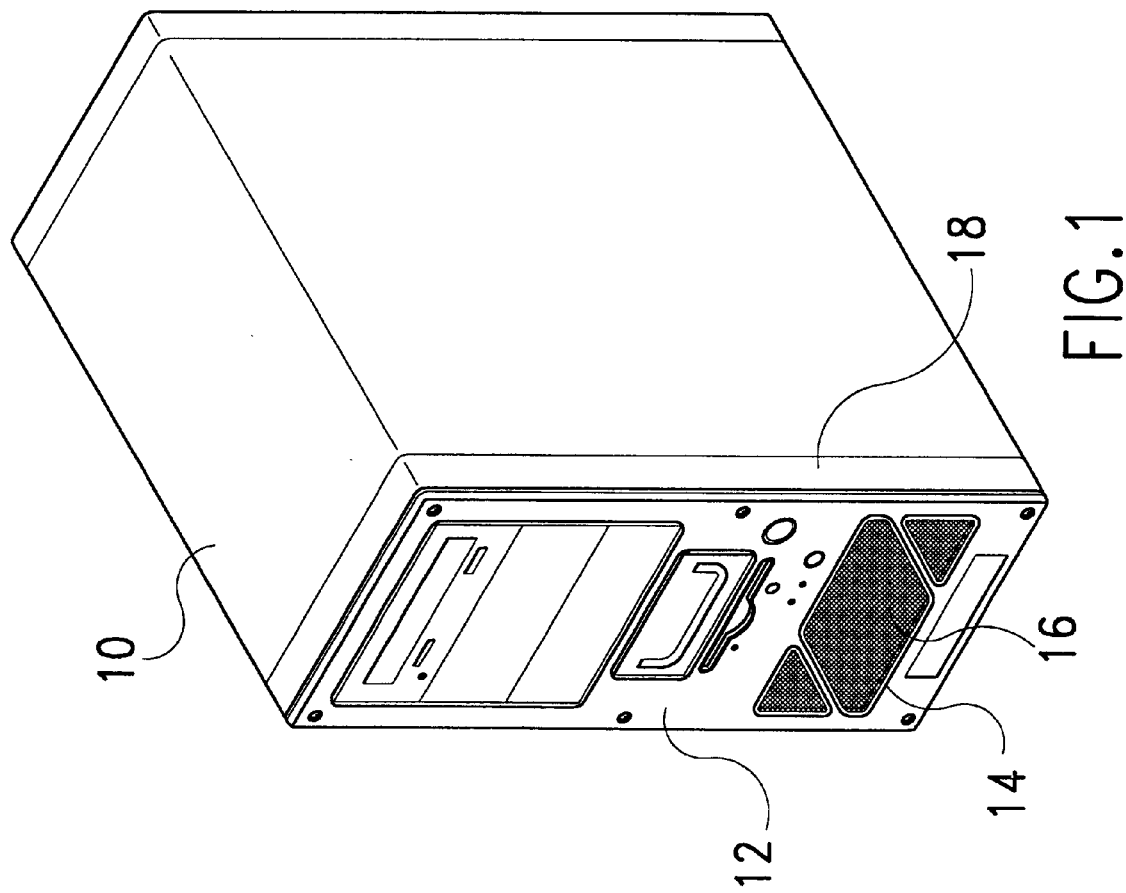
FIG. 1 is an oblique front elevation of a device case constructed according to the present invention.
Figure 2:
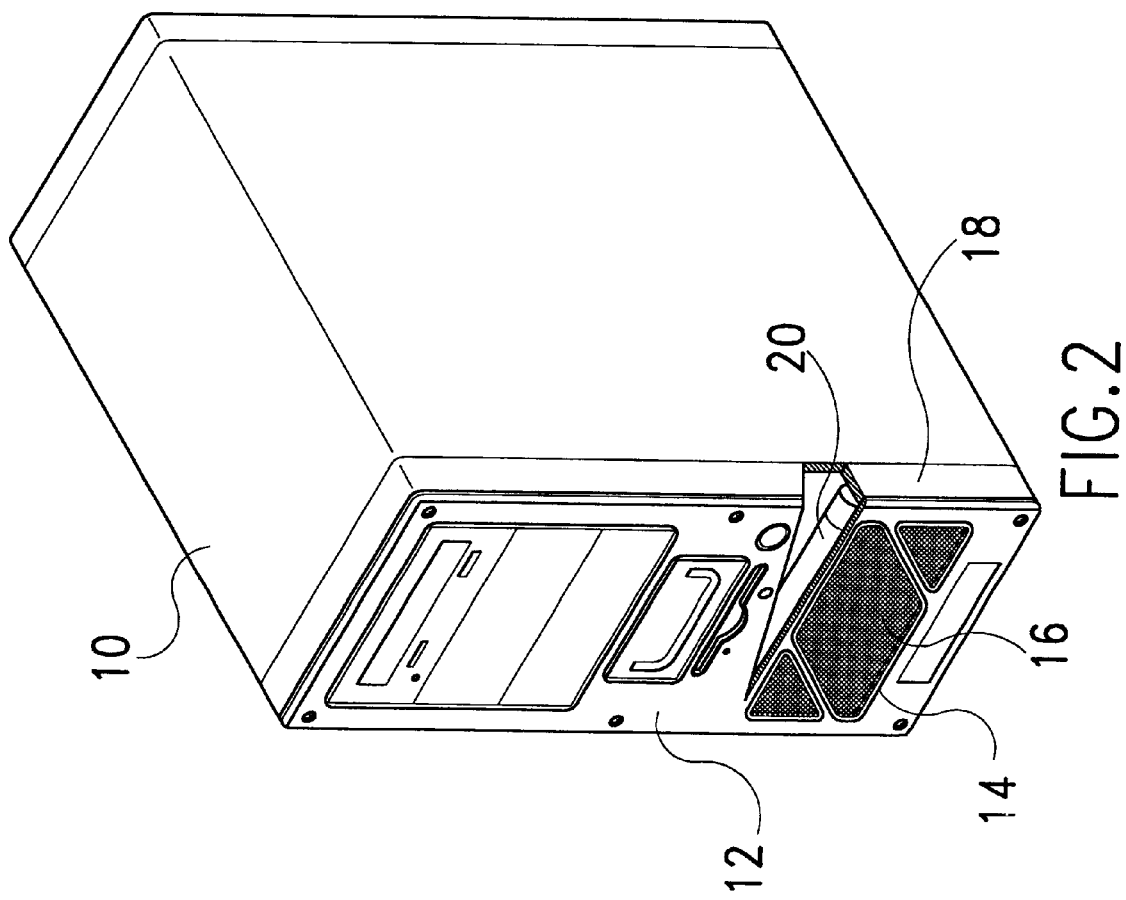
FIG. 2 is a front elevational view, partially in cutaway, of the device case shown in FIG. 1.

Referring to FIGS. 1 and 2, a device case according to the present preferred embodiment is a computer case 10. The computer case 10 comprises a front frame 18, and a metal face panel 12 provided at the front side of the front frame 18. The face panel 12 comprises an air input port 14, and a metal wire gauze filter 16 mounted in the air input port 14 and adapted to remove solid matter from air passing through the air input port 14.

Figure 3:
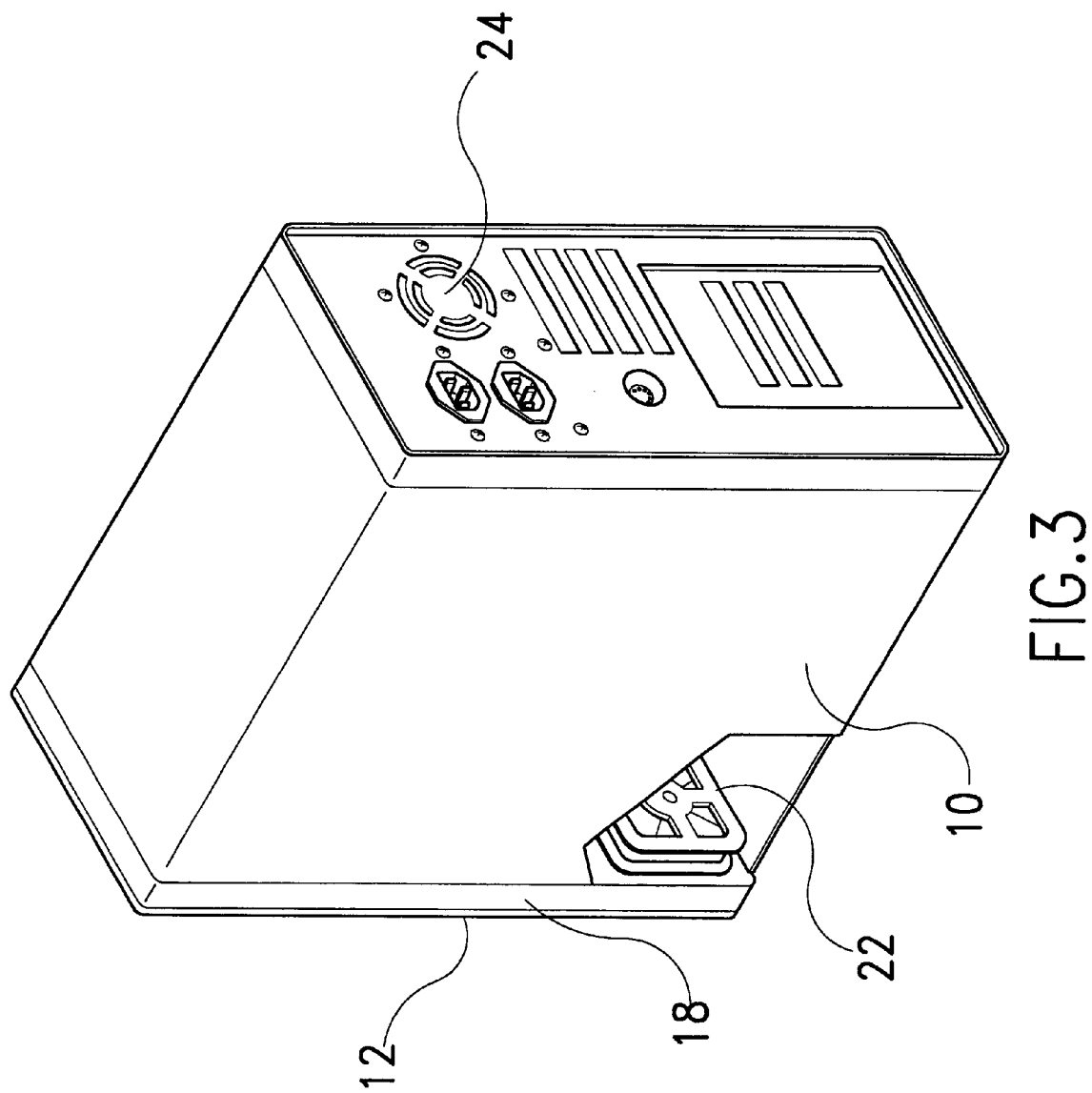
FIG. 3 is a rear elevational view, partially in cutaway, of the device case according to the present invention.

Referring to FIG. 3 and FIG. 2 again, an induced-draft fan 22 is installed in the front frame 18 behind the face panel 12 and horizontally aimed at the air input port 14, and an ultraviolet lamp (ultraviolet lamp tube or ultraviolet light emitting diode) 20 is installed in the front frame 18 above the induced-draft fan 22. The ultraviolet lamp 20 and the induced-draft fan 22 are electrically connected to the power system of the host computer installed in the computer case 10 to obtain the necessary working voltage. The inner surface of the face panel 12, the frame 18, the wire gauze filter 16, and the inside wall of the computer case 10 are respectively coated with a layer of titanium dioxide photocatalyst.

Figure 4:
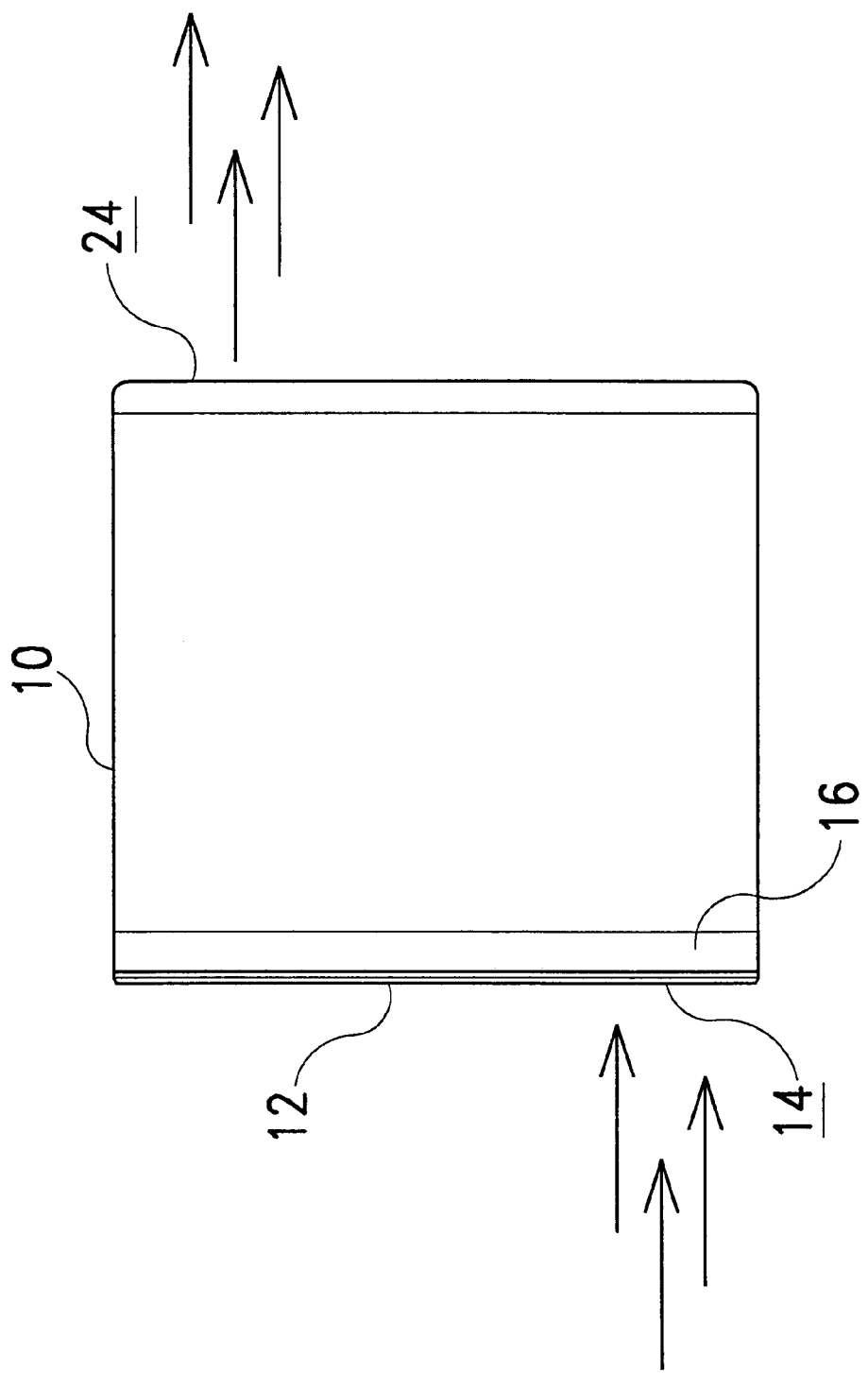
FIG. 4 is a schematic drawing showing the direction of currents of air through the device case according to the present invention.

Referring to FIG. 4 and FIGS. 2 and 3 again, during operation of the computer, the induced-draft fan 22 draw outside air into the air input port 14 toward the air output port 24 at the back side of the computer case 10, and at the same time the ultraviolet lamp 20 emits ultraviolet light onto the layer of titanium dioxide photocatalyst to purify currents of air passing through the computer case 10. Therefore, the computer case 10 works as an air purifier to purify air during the operation of the computer.

Further, in case the ultraviolet lamp 20 or the induced-draft fan 22 fails to function well, the face panel 12 is removed from the frame 18, and the user can than repair or replace the damaged ultraviolet lamp 20 or induced-draft fan 22.

A prototype of device has been constructed with the features of FIGS. 1~4. The device case functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A device case comprising a front frame, and a metal face panel provided at a front side of said front frame, an air input port disposed in said face panel, a metal wire gauze filter mounted in said air input port and adapted to remove solid matter from air passing through said air input port, an air output port disposed at a back side thereof, an induced-draft fan installed in said front frame and adapted to draw outside air into said air input port toward said air output port, an ultraviolet light source means installed in said front frame above said induced-draft fan, and a layer of titanium dioxide photocatalyst coated on an inner surface of said face panel, said frame, said wire gauze filter, and an inside wall of said case within the radiation of ultraviolet light from said ultraviolet light source means.

2. The device case of claim 1, wherein said ultraviolet light source means comprises an ultraviolet lamp tube.

3. The device case as claimed in claim 1, wherein said ultraviolet light source means comprises at least one ultraviolet light emitting diode.

* * * * *